(12) United States Patent
Khalfan et al.

(10) Patent No.: US 10,970,560 B2
(45) Date of Patent: Apr. 6, 2021

(54) SYSTEMS AND METHODS TO TRIGGER PRESENTATION OF IN-VEHICLE CONTENT

(71) Applicant: Disney Enterprises, Inc., Burbank, CA (US)

(72) Inventors: Alif Khalfan, Burbank, CA (US); Patricia Chao, Burbank, CA (US); Thomas M. DeKeyser, Burbank, CA (US); David Feder, Burbank, CA (US); Nina W. Chai, Sunnyvale, CA (US); David Castor, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 234 days.

(21) Appl. No.: 15/870,287

(22) Filed: Jan. 12, 2018

(65) Prior Publication Data

US 2019/0220674 A1    Jul. 18, 2019

(51) Int. Cl.
  *G06K 9/00*    (2006.01)
(52) U.S. Cl.
  CPC ..... *G06K 9/00791* (2013.01); *G06K 9/00832* (2013.01)
(58) Field of Classification Search
  None
  See application file for complete search history.

(56) References Cited

U.S. PATENT DOCUMENTS

| 1,004,331 A | 9/1911 | Wright |
| 1,004,624 A | 10/1911 | Brann |
| 5,299,291 A | 3/1994 | Ruetz |
| 5,766,077 A | 6/1998 | Hongo |
| 6,007,338 A | 12/1999 | Dinunzio |
| 6,053,815 A | 4/2000 | Hara |

(Continued)

FOREIGN PATENT DOCUMENTS

| IN | 1381KOL2007 | 4/2009 |
| JP | 2019065430 | 4/2019 |

(Continued)

OTHER PUBLICATIONS

Apple (Developing Wireless CarPlay System, https://developer.apple.com/videos/play/wwdc2017/717/, WWDC 2017, video and slide). (Year: 2017).*

(Continued)

*Primary Examiner* — Randolph I Chu
(74) *Attorney, Agent, or Firm* — Esplin & Associates, PC

(57) ABSTRACT

This disclosure relates to a system to trigger presentation of in-vehicle content based on detected physical objects. The system may be coupled to a vehicle. The system may include one or more physical processors. The processor(s) may be configured to obtain output signals conveying detection information that facilitates detection and identification of physical objects near and/or within an interior of the vehicle. The processor(s) may be configured to identify the physical objects near or within the interior of the vehicle. The processor(s) may be configured to obtain usage information conveying recent and/or anticipated use of the physical objects. The processor(s) may be configured to control one or more vehicle components to provide content that is specific to the identity of the physical object and/or specific to the usage information.

14 Claims, 4 Drawing Sheets

(56) References Cited

U.S. PATENT DOCUMENTS

| | | | |
|---|---|---|---|
| 6,200,138 B1 | 3/2001 | Ando | |
| 6,691,032 B1 | 2/2004 | Irish | |
| 7,081,033 B1 | 7/2006 | Mawle | |
| 7,266,847 B2 | 9/2007 | Pauker | |
| 7,739,371 B2 | 6/2010 | Ikegaya | |
| 7,837,544 B2 | 11/2010 | Tipping | |
| 8,190,295 B1 | 5/2012 | Garretson | |
| 8,758,126 B2 * | 6/2014 | Bavitz | A63F 9/24 463/30 |
| 8,831,228 B1 | 9/2014 | Agrawal | |
| 8,882,595 B2 | 11/2014 | Chowdhary | |
| 8,894,462 B2 | 11/2014 | Leyland | |
| 8,941,690 B2 * | 1/2015 | Seder | G02B 27/01 340/438 |
| 8,988,465 B2 | 3/2015 | Baron | |
| 9,007,400 B2 | 4/2015 | Takahashi | |
| 9,008,310 B2 | 4/2015 | Nelson | |
| 9,266,018 B2 * | 2/2016 | Story, Jr. | A63F 9/24 |
| 9,293,042 B1 | 3/2016 | Wasserman | |
| 9,327,189 B2 * | 5/2016 | Bavitz | A63F 9/24 |
| 9,361,730 B2 * | 6/2016 | Keating | H04N 21/4126 |
| 9,467,515 B1 | 10/2016 | Penilla | |
| 9,610,510 B2 | 4/2017 | Comploi | |
| 9,643,086 B2 | 5/2017 | Tipping | |
| 9,669,302 B2 | 6/2017 | Park | |
| 9,674,361 B2 | 6/2017 | Ristock | |
| 9,715,764 B2 * | 7/2017 | Alaniz | G06F 3/04815 |
| 9,744,448 B2 | 8/2017 | Mullen | |
| 9,814,991 B2 | 11/2017 | Van Winkle | |
| 9,821,920 B2 | 11/2017 | Cole | |
| 9,922,466 B2 | 3/2018 | Donnelly | |
| 10,019,070 B2 * | 7/2018 | Szczerba | G06F 3/017 |
| 10,025,431 B2 * | 7/2018 | Li | G06F 3/0488 |
| 10,045,147 B2 * | 8/2018 | Dickow | H04L 67/12 |
| 10,059,347 B2 * | 8/2018 | Thieberger-Navon | B60W 50/14 |
| 10,123,155 B2 * | 11/2018 | Grover | H04W 4/48 |
| 10,140,464 B2 * | 11/2018 | Lebeck | G06F 21/6218 |
| 10,162,998 B2 * | 12/2018 | Park | G06F 3/013 |
| 10,186,065 B2 | 1/2019 | Anderson | |
| 10,310,600 B2 * | 6/2019 | Hong | G02B 27/0101 |
| 10,339,711 B2 * | 7/2019 | Ng-Thow-Hing | G06F 3/013 |
| 10,366,290 B2 | 7/2019 | Wang | |
| 10,376,776 B2 | 8/2019 | Lowe | |
| 10,482,669 B2 | 11/2019 | Rober | |
| 10,501,053 B2 * | 12/2019 | Tokunaga | H04L 63/108 |
| 10,506,092 B1 * | 12/2019 | Stephenson | H04W 4/06 |
| 10,572,123 B2 * | 2/2020 | Penilla | H04L 63/104 |
| 10,585,471 B2 | 3/2020 | Reichow | |
| 10,589,625 B1 | 3/2020 | Goslin | |
| 10,639,557 B2 | 5/2020 | Hake | |
| 2003/0027636 A1 | 2/2003 | Covannon | |
| 2003/0104824 A1 | 6/2003 | Hale | |
| 2003/0130031 A1 | 7/2003 | Yoshida | |
| 2004/0059922 A1 | 3/2004 | Harris | |
| 2005/0021192 A1 | 1/2005 | Takafuji | |
| 2005/0059483 A1 | 3/2005 | Borge | |
| 2006/0052153 A1 | 3/2006 | Vlazny | |
| 2006/0143270 A1 | 6/2006 | Wodtke | |
| 2006/0224456 A1 | 10/2006 | Walker | |
| 2006/0277100 A1 | 12/2006 | Parham | |
| 2007/0060233 A1 | 3/2007 | Liccardo | |
| 2007/0087834 A1 | 4/2007 | Moser | |
| 2007/0093299 A1 | 4/2007 | Bergeron | |
| 2007/0139671 A1 | 6/2007 | Stevens | |
| 2007/0197275 A1 | 8/2007 | Gagner | |
| 2007/0206023 A1 | 9/2007 | Street | |
| 2008/0091782 A1 | 4/2008 | Jakobson | |
| 2008/0105751 A1 | 5/2008 | Landau | |
| 2008/0148067 A1 | 6/2008 | Sitrick | |
| 2008/0200244 A1 | 8/2008 | Rowe | |
| 2008/0309010 A1 | 12/2008 | Bowling | |
| 2008/0311983 A1 | 12/2008 | Koempel | |
| 2009/0069084 A1 | 3/2009 | Reece | |
| 2009/0079705 A1 | 3/2009 | Sizelove | |
| 2009/0137323 A1 | 5/2009 | Fiegener | |
| 2009/0176566 A1 | 7/2009 | Kelly | |
| 2009/0313358 A1 | 12/2009 | Shepherd | |
| 2010/0033427 A1 | 2/2010 | Marks | |
| 2010/0093421 A1 | 4/2010 | Nyman | |
| 2010/0098092 A1 | 4/2010 | Luo | |
| 2010/0130296 A1 | 5/2010 | Ackley | |
| 2010/0182340 A1 | 7/2010 | Bachelder | |
| 2010/0324984 A1 | 12/2010 | Pelto | |
| 2010/0331721 A1 | 12/2010 | Epley | |
| 2011/0098092 A1 | 4/2011 | Reiche, III | |
| 2011/0183754 A1 | 7/2011 | Alghamdi | |
| 2011/0216948 A1 | 9/2011 | Yalla | |
| 2012/0089275 A1 | 4/2012 | Yao-Chang | |
| 2012/0142415 A1 | 6/2012 | Lindsay | |
| 2012/0256945 A1 | 10/2012 | Kidron | |
| 2012/0264518 A1 | 10/2012 | Rouille | |
| 2012/0289122 A1 | 11/2012 | Elliott | |
| 2012/0295703 A1 | 11/2012 | Reiche | |
| 2012/0295704 A1 | 11/2012 | Reiche | |
| 2013/0030645 A1 * | 1/2013 | Divine | B60K 35/00 701/36 |
| 2013/0083003 A1 | 4/2013 | Perez | |
| 2013/0083061 A1 | 4/2013 | Mishra | |
| 2013/0157607 A1 | 6/2013 | Paek | |
| 2013/0166147 A1 | 6/2013 | Chudzinski | |
| 2013/0274024 A1 | 10/2013 | Geylik | |
| 2013/0296058 A1 | 11/2013 | Leyland | |
| 2014/0067208 A1 | 3/2014 | Klappert | |
| 2014/0100020 A1 | 4/2014 | Carroll | |
| 2014/0100029 A1 | 4/2014 | Reiche | |
| 2014/0128144 A1 | 5/2014 | Bavitz | |
| 2014/0128145 A1 | 5/2014 | Hwang | |
| 2014/0162785 A1 | 6/2014 | Reiche | |
| 2014/0163771 A1 * | 6/2014 | Demeniuk | B60K 37/06 701/2 |
| 2014/0189017 A1 | 7/2014 | Prakash | |
| 2014/0274313 A1 | 9/2014 | Bala | |
| 2014/0295963 A1 | 10/2014 | Ishikawa | |
| 2014/0342790 A1 | 11/2014 | Kim | |
| 2015/0003609 A1 | 1/2015 | Nelson | |
| 2015/0024852 A1 | 1/2015 | Pacey | |
| 2015/0065237 A1 | 3/2015 | Hohn | |
| 2015/0080125 A1 | 3/2015 | Andre | |
| 2015/0097860 A1 | 4/2015 | Alaniz | |
| 2015/0097864 A1 | 4/2015 | Alaniz | |
| 2015/0100179 A1 | 4/2015 | Alaniz | |
| 2015/0145671 A1 | 5/2015 | Cohen | |
| 2015/0174479 A1 | 6/2015 | Reiche | |
| 2015/0202962 A1 | 7/2015 | Habashima | |
| 2015/0269780 A1 | 9/2015 | Herman | |
| 2015/0294505 A1 | 10/2015 | Atsmon | |
| 2015/0346722 A1 | 12/2015 | Herz | |
| 2015/0363092 A1 | 12/2015 | Morton | |
| 2016/0042607 A1 | 2/2016 | McCoy | |
| 2016/0071397 A1 | 3/2016 | Logan | |
| 2016/0096114 A1 | 4/2016 | Van Winkle | |
| 2016/0189444 A1 | 6/2016 | Madhok | |
| 2016/0199730 A1 | 7/2016 | Olson | |
| 2016/0206955 A1 | 7/2016 | Goslin | |
| 2016/0206957 A1 | 7/2016 | Goslin | |
| 2016/0216854 A1 | 7/2016 | McClellan | |
| 2016/0224939 A1 | 8/2016 | Chen | |
| 2016/0299567 A1 | 10/2016 | Crisler | |
| 2016/0310839 A1 | 10/2016 | Leyland | |
| 2016/0313792 A1 | 10/2016 | Siegel | |
| 2016/0346704 A1 | 12/2016 | Wagner | |
| 2017/0021273 A1 | 1/2017 | Rios | |
| 2017/0021282 A1 | 1/2017 | Comploi | |
| 2017/0045946 A1 | 2/2017 | Smoot | |
| 2017/0050743 A1 | 2/2017 | Cole | |
| 2017/0068311 A1 | 3/2017 | Evans | |
| 2017/0072316 A1 | 3/2017 | Finfter | |
| 2017/0078621 A1 | 3/2017 | Sahay | |
| 2017/0103571 A1 | 4/2017 | Beaurepaire | |
| 2017/0106288 A1 | 4/2017 | Reiche | |
| 2017/0132334 A1 | 5/2017 | Levinson | |
| 2017/0154024 A1 | 6/2017 | Subramanya | |
| 2017/0158023 A1 | 6/2017 | Stevanovic | |

(56) References Cited

U.S. PATENT DOCUMENTS

| | | | |
|---|---|---|---|
| 2017/0166221 A1 | 6/2017 | Osterman | |
| 2017/0236328 A1 | 8/2017 | Eatedali | |
| 2017/0253252 A1 | 9/2017 | Donnelly | |
| 2017/0330034 A1 | 11/2017 | Wang | |
| 2017/0344754 A1 | 11/2017 | Kumar | |
| 2017/0352185 A1 | 12/2017 | Bonilla Acevedo | |
| 2018/0008894 A1 | 1/2018 | Sack | |
| 2018/0011988 A1 | 1/2018 | Ziegler | |
| 2018/0040162 A1 | 2/2018 | Donnelly | |
| 2018/0040163 A1 | 2/2018 | Donnelly | |
| 2018/0043272 A1 | 2/2018 | Van Winkle | |
| 2018/0089900 A1 | 3/2018 | Rober | |
| 2018/0089901 A1 | 3/2018 | Rober | |
| 2018/0096501 A1 | 4/2018 | Anderson | |
| 2018/0181412 A1 | 6/2018 | Paratey | |
| 2018/0231973 A1 | 8/2018 | Mattingly | |
| 2018/0247352 A1 | 8/2018 | Rogers | |
| 2018/0369702 A1 | 12/2018 | Hake | |
| 2019/0001987 A1 | 1/2019 | Kim | |
| 2019/0014070 A1 | 1/2019 | Mertvetsov | |
| 2019/0047498 A1 | 2/2019 | Alcaidinho | |
| 2019/0065970 A1 | 2/2019 | Bonutti | |
| 2019/0075437 A1* | 3/2019 | Shaikh | H04M 1/6091 |
| 2019/0101976 A1 | 4/2019 | Reichow | |
| 2019/0157607 A1 | 5/2019 | Kim | |
| 2020/0053400 A1 | 2/2020 | Chao | |
| 2020/0074181 A1 | 3/2020 | Chang | |
| 2020/0163616 A1 | 5/2020 | Sakaya | |
| 2020/0193163 A1 | 6/2020 | Chang | |

FOREIGN PATENT DOCUMENTS

| | | | |
|---|---|---|---|
| WO | 2007101785 | A1 | 9/2007 |
| WO | 2018128946 | A1 | 7/2018 |

OTHER PUBLICATIONS

NPX "Software-Apple-Carplay: Software Technology for CarPlay", https://www.nxp.com/design/software/embedded-software/software-technology-for-carplay:Software-Apple-Carplay (Year: 2020).*

Google search "Iphone Figurein" (Year: 2020).*

Adam Hartley, 5 Predictions for the Future of in-Car Entertainment, Apr 9, 2019 [https://360.here.com/5-predictions-for-the-future-of-in-car-leisure-entertainment], (5 pages).

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

"Battle Circuit", Capcom, available at «https://web.archive.org/web/20000111 073021 /http://www.capcom.co.jp/newproducts/arcade/battle/bs-top. html» (Orig in al Japanese web page followed by English translation), 4 pages.

"Sun CriesSun Cries", http://web.archive.org, Mar. 9, 2012 (Ma. 9, 2012), XP055152538, Retrieved from the Internet: URL: http://web.archive.org/web/20120309212642/http://www.suncries.com/skylanders-hac king [retrieved on Nov. 12, 2014] (8 pgs).

"Video Game! Battle Circuit", TV Tropes, available at «https://web.archive.org/web/20150114005112/http://tvtropes.org/pmwiki/pmwiki.php/VideoGameBattleCircuit» (4 pages).

Dagamant, 'Skylanders Hacking', Retrieved from the Internet http://web.archive.ora/web/20120309212642/http://www,suncries.com/skvlaners-hack ing Feb. 27, 2012, XP055152538, 8 pages.

Extended European Search Report issued in European Patent Application No. 14175300.4, dated Nov. 19, 2014. (6 pgs).

Kloster, Benjamin, 'Wanted: Encryption Scheme for Copy Protection Purposes', Retrieved from the Internet http://stackoverflow.com/questions/14529732/wanted-encrYption-scheme-for-copy-protection-purposes, Jan. 25, 2013, XP055152568, 2 pages.

* cited by examiner

SYSTEMS AND METHODS TO TRIGGER PRESENTATION OF IN-VEHICLE CONTENT

FIELD

This disclosure relates to systems and methods to trigger presentation of in-vehicle content.

BACKGROUND

Modern vehicles include advanced systems for navigation and entertainment. For example, navigation systems may prompt a driver of required maneuvers utilizing advanced maps as well as voice-based interactions. Entertainment systems, including audio and visual systems, are a staple in most vehicles and can be found through a vehicle. For example, a video screen may be mounted to the backs of headrests and/or on purpose built entertainment systems.

SUMMARY

This disclosure relates to systems and methods to trigger presentation of content in vehicles ("in-vehicle content") based on detected physical objects. The content may include one or more of audio content, visual content, haptic content, and/or other content. The presented in-vehicle content may be specific to the identity of the detected physical objects and/or may be specific to information related to recent and/or anticipated use of the physical objects. The content may be presented using one or more vehicle components of a vehicle. The one or more vehicle components may include one or more of a display, an audio output device, a climate control system, and/or other components of the vehicle.

Vehicle technology is becoming more and more hands-off. Voice-based guidance is likely becoming the predominant form of communication with vehicles. One or more implementations of the systems and methods presented herein may bring value to this medium by providing rich entertainment with passengers by automatically detecting and identifying physical object(s) brought into the vehicle and providing content related to the physical object(s). The automatic provision of content may not require specific user input, other than simply bringing a physical object near and/or within an interior of a vehicle.

By way of non-limiting illustration, a physical object near and/or within an interior of a vehicle may be detected. An identify of the physical object may be determined. In some implementations, content specific to the identity of the physical object may be selected and presented though one or more vehicle components. In some implementations, the content specific to the identity of the physical object may cause the vehicle to take on a personality that may be the same as or similar to the physical object. For example, the physical object may be a t-shirt depicting a movie and/or game entity. The content specific to the identity of the physical object may include changing the vehicles navigation system to use a voice prompt that is, or resembles, the voice of the movie and/or game entity.

In some implementations, usage information describing recent and/or anticipated use of one or more physical objects may be obtained. In some implementations, content specific to the recent and/or anticipated use of a physical object may be selected and presented though one or more vehicle components. In some implementations, the content specific to the recent and/or anticipated use of the physical object may cause the vehicle to generate an in-vehicle experience that may include and/or reference the recent and/or antici- pated use of the physical object. By way of non-limiting illustration, the physical object may be an RFID enabled wearable device. The wearable device may be configured to track a user's experience in the real-world, for example, though a theme park. The provision of content specific to the recent and/or anticipated use of the physical object may include prompting an entertainment system in the vehicle to play visual and/or audio content (e.g., an animation) related to the experiences in the real-world (e.g., show the places they visited in the theme park). The utilization of usage information may provide a more personal experience compared to content specific to the identification of physical objects.

One or more implementations of the systems presented herein may be at least partially coupled to, or included in, a vehicle. The vehicle may include a passenger vehicle and/or other vehicle configured to transport people. The passenger vehicle may be self-propelled (e.g., a sedan, a truck, a bus, and/or other vehicles), attached to an engine (e.g., a train, trolley, tug or similar vehicle), or may be coasting or ballistic (e.g., an orbiting, falling, or coasting vehicle).

A system configured to trigger presentation of in-vehicle content based on detected physical objects may include one or more of a vehicle, one or more physical processors, one or more vehicle sensors, one or more docks, one or more displays, one or more audio output devices, and/or other components. The one or more displays and/or one or more audio output devices may include at least part of a navigation system and/or entertainment system of the vehicle.

In some implementations, the one or more processors may be configured by machine-readable instructions. The machine-readable instructions may include one or more computer program components. The computer program components may include one or more of a detection component, a usage component, a content component, a control component, and/or other components.

The detection component may be configured to obtain output signals conveying detection information and/or other information. The detection information may facilitate detection and/or identification of physical objects near and/or within an interior of the vehicle.

The detection component may be configured to detect, based on the output signals, presence of one or more physical objects near and/or within the interior of the vehicle. By way of non-limiting illustration, detection component may detect presence of a first physical object and/or other physical objects near and/or within the interior of the vehicle.

The detection component may be configured to identify, based on the output signals, the one or more physical objects detected as being present near or within the interior of the vehicle. By way of non-limiting illustration, detection component may be configured to identify the first physical object and/or other physical objects.

The usage component may be configured to obtain usage information and/or other information. The usage information may convey recent and/or anticipated use of the one or more physical objects detected as being present near and/or within the interior of the vehicle. By way of non-limiting illustration, usage component may be configured to obtain first usage information conveying recent and/or anticipated use of the first physical object.

In some implementations, the content component may be configured to determine content that is specific to the usage information. In some implementations, content component may be configured to determine content that is specific to the identity of the one or more physical objects detected as being present near or within the interior of the vehicle. By way of non-limiting illustration, content component may be configured to determine first content that is specific to the identification of the first physical object and/or specific to the first usage information.

In some implementations, control component may be configured to control one or more vehicle components coupled to the vehicle to provide the content that is specific to the identity of the one or more physical objects. In some implementations, control component may be configured to control one or more vehicle components coupled to the vehicle to provide the content that is specific to the usage information. By way of non-limiting illustration, control component may be configured to control a first vehicle component and/or other vehicle components to provide the first content being specific to the identity of the first physical object and/or the first usage information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. The drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
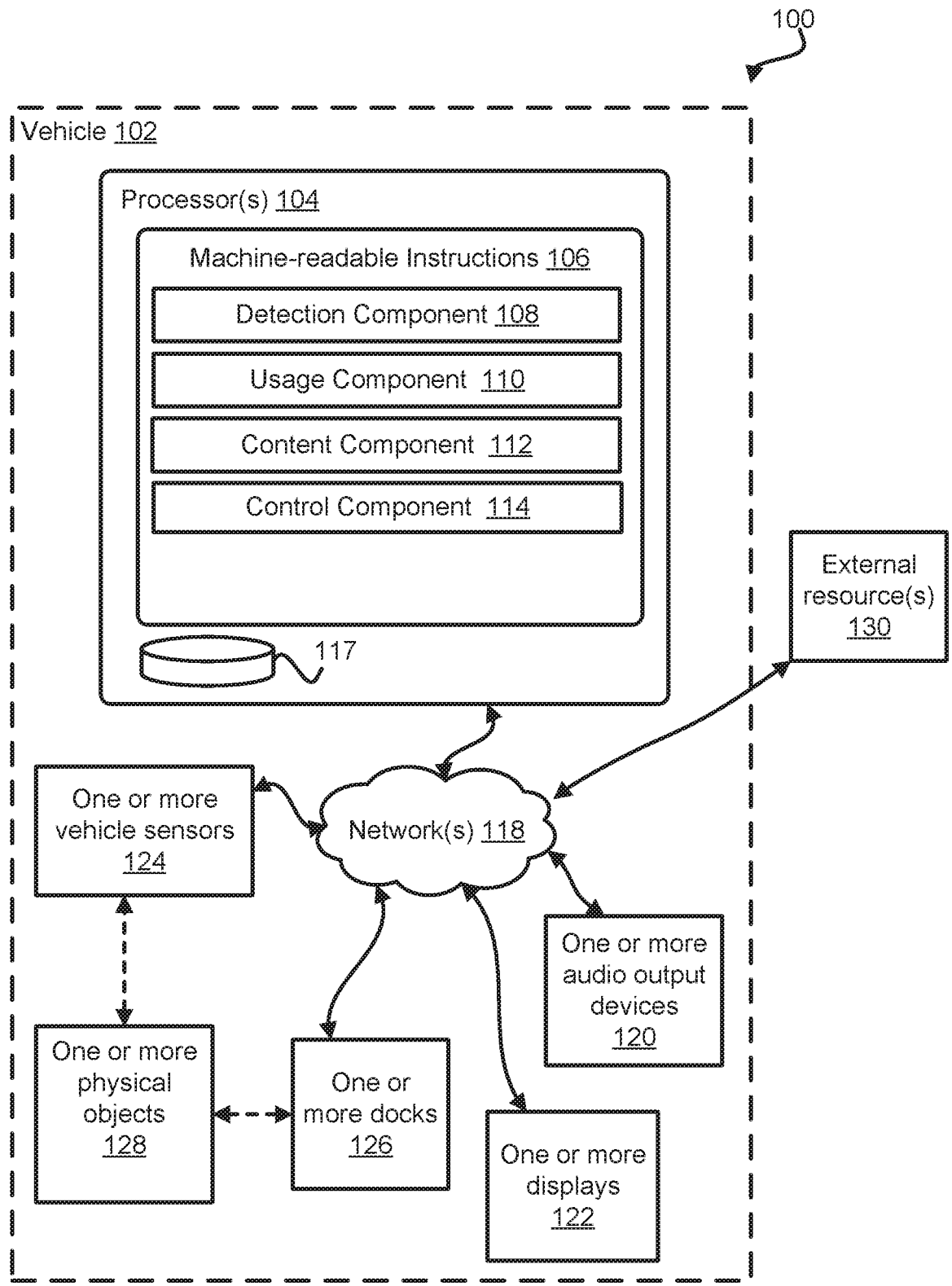
FIG. 1 illustrates a system configured to trigger presentation of in-vehicle content, in accordance with one or more implementations.

FIG. 1 illustrates a system 100 configured to trigger presentation of in-vehicle content, in accordance with one or more implementations. The system 100 may be at least partially coupled to, or included in, a vehicle 102. The vehicle 102 may include a passenger vehicle and/or other vehicles. The vehicle 102 may be self-propelled (e.g., a sedan, a truck, a bus, and/or other vehicles), attached to an engine (e.g., a train, trolley, tug or similar vehicle), and/or may be coasting or ballistic (e.g., an orbiting, falling or coasting vehicle).

One or more implementations of system 100 may be configured to bring entertainment to vehicle 102 by providing content to passengers based on an automatic detection and/or identification of physical object(s) brought near and/or within the vehicle. The content may be specific to the identity of the physical object(s) and/or may be specific to recent and/or anticipated use of the physical object(s). In some implementations, the automatic provision of content may not require specific user input, other than simply bringing a physical object near and/or within an interior of a vehicle. The provided content may transform the vehicle's "personality" to match that of one or more detected physical objects, and/or may provide rich entertainment personalized to a user's recent and/or anticipated use of physical object(s).

The system 100 may include one or more of one or more physical processors 104, one or more vehicle components, one or more vehicle sensors 124, one or more docks 126, one or more physical objects 128, external resource(s) 130, and/or other components. The one or more vehicle components may include one or more of one or more audio output devices 120, one or more displays 122, and/or other components. Some or all components of system 100 may be installed in vehicle 102 and/or otherwise coupled with vehicle 102. The one or more audio output devices 120, one or more displays 122, and/or other vehicle components may be included as part of one or both of a vehicle entertainment system and/or a vehicle navigation system. A vehicle entertainment system and/or a vehicle navigation system may be disposed within a console of vehicle 102 and/or other locations within vehicle. In some implementations, an individual display and/or an individual audio output device may be incorporated into one or more of a headrest, a ceiling, an arm rest, and/or other location within vehicle 102. An individual audio output device may comprise, for example, a speaker.

The one or more vehicle sensors 124 and/or one or more docks 126 may provide interfaces for individual ones of one or more physical objects 128 to interact with one or more physical processor 104 and/or other components of system 100. By way of non-limiting illustration, one or more vehicle sensors 124 and/or one or more docks 126 may be configured to generate output signals conveying detection information and/or other information. The detection information may facilitate presence detection and/or identification of physical objects near and/or within an interior of vehicle 102.

The one or more vehicle sensors 124 may be installed in vehicle 102 and/or may be otherwise coupled with vehicle 102. The one or more vehicle sensors 124 may be configured to generate output signals conveying detection information and/or other information. The one or more vehicle sensors 124 may include one or more of an image sensor (e.g., monocular and/or stereo cameras), an audio sensor (e.g., to detect sound outside and/or inside vehicle), and/or other sensors.

The image sensor may generate output signals conveying detection information in the form of image information. The image information may define visual content in the form of one or more images. Images may be defined by pixels and/or other information. Pixels may be characterized by one or more of pixel location, pixel color, pixel transparency, and/or other information. The image information may facilitate detection and/or identification of physical objects near and/or within an interior of vehicle 102 by virtue of the visual content defined by the image information including depictions of the one or more physical objects. One or more image-based object detection and/or identification techniques may be utilized to detect presence of objects within images and/or identify those objects within the images. By way of non-limiting illustration, techniques may include one or more of computer vision, Speeded Up Robust Features (SURF), Scale-invariant Feature Transform (SIFT), Oriented FAST and rotated BRIEF (ORB), Optical Character Recognition (OCR), and/or other techniques.

An audio sensor may generate output signals conveying detection information in the form of audio information. The audio information may define voice and/or sounds captured by the audio sensor. An audio sensor may include a separate device and/or may be part of another device. For example, an audio sensor may include a microphone. The microphone may be coupled to a vehicle component of the vehicle 102. The audio information may facilitate detection and/or identification of physical objects near and/or within an interior of vehicle 102 by virtue of the voice and/or sounds captured by the audio sensor including utterances that convey presence and/or identification of one or more physical object. By way of non-limiting illustration, a user may utter that they are carrying a particular physical object, by uttering the identify (e.g., name) of the physical object. One or more audio recognition techniques may be utilized to detect presence of objects and/or identify those objects from sounds captured by the audio sensor.

An individual physical object of one or more physical objects 128 may be a standalone physical object. In some implementations, the individual physical object may depict and/or may have a form factor that physically embodies an appearance of an entity. The entity may be a virtual entity such as one or more of a game entity, a movie entity, and/or other entities. The entity may be a fantastical entity, such as a fictional character in a movie portrayed by a real person. Examples of form factors may include one or more of a toy figurine, a toy accessory, article of clothing, and/or other form factors. By way of non-limiting example, a physical object may be one or more of a toy figurine embodying an appearance of a fictional character in a movie, a toy accessory embodying an appearance of a tool or object utilized by a fictional character in a movie or video game, a t-shirt depicting the fictional character, and/or other types of physical objects. A physical object may be an RFID enabled device including one or more of one or more radio frequency communication components, non-transitory electronic storage, and/or other components. The one or more radio frequency communication components may be configured to facilitate communication with one or more docks 126. The non-transitory electronic storage may be configured to store one or more of user identification information, object identification information, usage information, and/or other information.

In some implementations, detection of presence of a physical object and/or identification of the physical object may be facilitated by electronics embedded within or otherwise included in the physical object. For example, the physical object may include a radio-frequency identification (RFID) chip configured to emit and/or receive radio-frequency electromagnetic signals responsive to the physical object being disposed in a proximity of an individual dock of one or more docks 126, and/or other components. As another example, the physical object may include an integrated circuit configured to transfer signals associated with one or more of identification of a user of the physical object and/or the physical object itself (e.g., object identification information and/or user identification information), the use of the physical object (e.g., usage information), and/or other information responsive to the physical object being placed in contact with a portion of an individual dock and/or within a proximity of the individual dock. In some implementations, some or all of the functionality of an individual dock may be attributed to an individual sensor of one or more vehicle sensors 124, where the individual sensor may include the same or similar components as the individual dock.

In some implementations, user identification information may include information that identifies individual users. The user identification information may include one or more of a name, a username, a handle, subscription information, and/or other information. The object identification information may include information that identifies individual physical objects. The communication of object identification may further facilitate detection of presence of the physical object storing the object identification information. The object identification information may include one or more of a name, a serial number, and/or other information. A serial number may be unique to an individual physical object. That is, even if two different physical objects depict the same entity (such that they appear as identical), the different physical objects may have different unique serial numbers to distinguish between them.

The usage information may convey recent and/or anticipated use of individual physical objects. In some implementations, recent and/or anticipated use of individual physical objects may refer to use in one or more of the real world, a virtual world (e.g., a game), and/or other types of use.

In some implementations, a physical object may include an object that may be used in gameplay. By way of non-limiting illustration, a physical object may be configured to interface with gaming consoles and/or computing platforms. In some implementations, a physical object may depict a game entity (e.g., game character) in a game. In some implementations, usage information stored by a physical object may include one or more of information associated with use of the physical object with a gaming console, information describing aspects and/or qualities of a game entity associated with the physical object, and/or other information. In some implementations, a physical object may interface with a gaming console via a reader configured to obtain signals from physical objects, provide signals associated with individual physical objects to the game console and/or a game server, and/or provide signals to the physical objects to store information carried by those signals in the physical objects.

In some implementations, a physical object may be a purpose-built device configured to track and/or store user activity within one or more geographic locations. The physical object may include one or more of a wristband, a tag, a card, a coin, and/or other objects. By way of non-limiting illustration, the object may be an RFID enabled device including one or more of one or more radio frequency communication components, non-transitory electronic storage, and/or other components. The non-transitory electronic storage may be configured to store one or more of user identification information, usage information, and/or other information. By way of non-limiting illustration, a physical object may include a device worn by users of a theme park, a cruise ship, a retail store, and/or other geographic locations.

In some implementations, an individual dock of one or more docks 126 may include a reader and/or other device configured to obtain signals from physical objects and/or provide signals associated with individual physical objects to one or more physical processors 104. A given signal may convey information including one or more one or more of physical object identification information, user identification information, usage information, and/or other information stored by the physical object. In some implementations, a reader may be a peripheral device configured to be communicatively coupled with vehicle 102 and/or one or more components of system 100. In some implementations, a reader may be integrated so as to form a singular device with a component of system 100 (e.g., integrated into a component of vehicle 102). A reader may include RFID components configured to communicate with RFID components (one or more radio frequency communication components) and/or other components.

In some implementations, with respect to usage information, recent use in the real world may include one or more of individual locations that the physical objects has been taken too, activities that a user has completed that involved the physical object, activities that the user has completed that didn't involve the physical object but the physical object was present, purchases made by the user, and/or other information. By way of non-limiting illustration, a theme park may include docks and/or readers disposed throughout the park which may be configured to detect presence and/or identify physical objects held by users. The detection of physical object may be associated with an activity in the theme park where the detection takes place. By way of non-limiting illustration, before getting on a ride, a user's physical object may be detected and/or identified by a reader located at the beginning of the ride. The usage information stored by the physical object may convey an activity of riding that ride. In some implementations, when combinations of physical objects are detected together by a reader, an activity may be recorded within usage information indicating collaboration of the physical objects.

In some implementations, anticipated use in the real world may include a plan and/or schedule that one or more users of one or more physical objects intends to carry out. The plan and/or schedule may be entered by a user (e.g., previously and/or in real time), predetermined (e.g., a prepaid theme park package), and/or formed in other ways. The plan and/or schedule may include one or more of locations to visit, activities to perform (e.g., attractions to participate in), locations to eat at, food to eat, people to interact with, and/or other information.

In some implementations, for physical objects usable in gameplay, the recent and/or anticipated use may further include one or more of use of the physical object with one or more readers of one or more gaming consoles, recent and/or anticipated gameplay using a game entity that the physical object depicts, and/or other information.

In some implementations, recent use of the physical object with one or more readers of one or more gaming consoles may include one or more of geographic locations of the readers used with the physical object, brands/makes/models of the gaming consoles coupled to the readers, quantity of times the physical object was coupled to a reader, frequency at which the physical object was coupled to a reader, other physical objects that may have been detected with the physical object by a given reader, and/or other information.

In some implementations, recent gameplay using a game entity that a physical object depicts may indicate one or more of games played, attributes obtained (e.g., leveling up, abilities acquired, virtual objects acquired, etc.), a score reach, a particular in-game task completed and/or attempted (e.g., tournaments, quests, missions, etc.), other players played with, and/or other information.

In some implementations, anticipated use of a physical object with one or more readers of one or more gaming consoles may indicate a plan and/or schedule that the user of a physical object intends to carry out with respect to a physical object and the one or more readers.

In some implementations, anticipated gameplay using a game entity that a physical object depicts may include a plan and/or schedule of tasks that the user of the physical object intends to carry out with respect to gameplay using the game entity. This may include planned and/or scheduled in-game tournaments, quests, missions, and/or other tasks.

Individual displays of one or more displays 122 may be configured to present visual content. Visual content may include content that may be observed visually. Visual content may include one or more of an image, a video, and/or other visual content. In some implementations, the visual content may include virtual content in the form of an interactive space. In some implementations, an individual display of one or more displays 122 may part of a wearable headset. A display may include one or more of a head-mounted display (HMD), an optical head-mounted display, a see-through display, an optical see-through display, a video see-through display, a visor, eyeglasses, sunglasses, a smartphone, a tablet, a mobile device, a projector, and/or other displays. In some implementations, an individual display of one or more displays 122 may include a set of displays that present visual content to each eye individually as stereo image pairs. In some implementations, one or more displays 122 may include other devices or components not worn by a user. For example, in an implementation, one or more displays 122 may include components integrated into a vehicle. For example, a headrest may include a display, windows of a vehicle may include or may be replaced with transparent or opaque displays, and/or displays may be integrated in other ways.

In some implementations, one or more vehicle components of vehicle 102 may further and/or alternatively include one or more of a climate control system, a lighting system, and/or other components. The climate control system may include one or more of an air conditioner, a header, a fan, a seat heater, a seat fan, and/or other components. A lighting system may include one or more of an overhead light (e.g., a cabin light), an interior under-glow light, an exterior underbody light, and/or other lights.

In FIG. 1, one or more physical processors 104 may be configured to provide information processing capabilities in system 100. The one or more physical processors 104 may be configured by machine-readable instructions 106. The machine-readable instructions 106 may include one or more computer program components. Executing the one or more computer program components may cause one or more physical processors 104 to facilitate triggering presentation of in-vehicle content based on detected physical objects. The computer program components may include one or more of a detection component 108, a usage component 110, a content component 112, a control component 114, and/or other components.

The detection component 108 may be configured to obtain output signals conveying detection information, and/or other information. The output signals may be obtained from one or more of the one or more vehicle sensors 124, one or more docks 126, and/or other sources. The detection information may facilitate detection and/or identification of one or more physical objects near and/or within an interior of the vehicle. In some implementations, "within" an interior of a vehicle may include being at or past a doorway threshold of the vehicle. In some implementations, "within" an interior of a vehicle may include being in a passenger seating area of the vehicle and/or other locations. In some implementations, "near" an interior of the vehicle may include at a door of the vehicle. In some implementations, "near" an interior of the vehicle may include a threshold distance from the vehicle. In some implementations, the threshold distance may be dictated by the arrangement and/or capabilities of one or more vehicle sensors 124 and/or one or more docks 126. By way of non-limiting illustration, the threshold distance may be dictated by a range of an RFID reader of a dock. In some implementations, the threshold distance may be dictated by an arrangement and/or position of an image sensor. By way of non-limiting illustration, an image sensor may be positioned to capture images of the real world within a field of view of the image sensor. If the image sensor is arranged so that the field of view includes areas both inside and outside the vehicle, the distance at which images may be clearly captured outside the vehicle may dictate the threshold distance.

The detection component 108 may be configured to detect, based on obtained output signals conveying detection information and/or other information, presence of one or more physical objects near and/or within the interior of the vehicle. Detection of presence may be facilitated by one or more techniques presented herein. For example, detection may be facilitated by one or more of an image-based technique, an audio-based technique, receiving output signals conveying object identification information, and/or other techniques.

By way of non-limiting illustration, detection component 108 may be configured to detect presence of a first physical object near and/or within the interior of the vehicle. The detection component 108 may be configured to detect presence of a combination of two or more physical objects. The combination may be detected as being contemporaneously present near and/or within the interior of the vehicle and/or sequentially present near and/or within the interior of the vehicle. Detection may be contemporaneously if the detection of multiple physical objects occur within a period of time. The period of time may be within a range of zero to five minutes, zero to three minutes, and/or other ranges. Sequentially may refer to an order at which multiple physical objects are detected. In some implementations, a sequence may be established based on objects being detected one after another. The sequence may be established if there is a gap of time between the detections. The gap of time may be greater than the period of time associated with contemporaneous detection.

The detection component 108 may be configured to identify, based on obtained output signals conveying detection information and/or other information, the one or more physical objects detected as being present near or within the interior of the vehicle. Identifying a physical object may include determining an identity of the physical object. Determining an identify of a physical object may include determining one or more of a name of the object, a unique identifier of the object, a theme of the object, a brand of the object, a color of the object, a manufacturer of the object, and/or other information. Identification may be performed using one or more techniques presented herein and/or other techniques. For example, identification may be facilitated by one or more of an image-based technique, an audio-based technique, receiving output signals conveying object identification information, and/or other techniques. The detection component 108 may be configured to identify the first physical object, a second physical object, and/or other physical objects. In some implementations, one or more of the first physical object, second physical object, and/or other physical objects may be associated with a single user. In some implementations, the first physical object may be associated with a first user and the second physical object may be associated with a second user.

The usage component 110 may be configured to obtain usage information associated with one or more physical objects 128 and/or other information. The usage information may be associated with one or more physical objects 128 by virtue of one or more of individual ones of the one or more physical objects 128 storing usage information, the usage information being associated with a specific physical object and/or user of that physical object, and/or other considerations. The usage information may convey recent and/or anticipated use of one or more physical objects 128 detected as being present near and/or within the interior of vehicle 102.

In some implementations, usage information may be obtained from one or more of one or more physical objects 128 (e.g., via one or more vehicle sensors 124 and/or one or more docks 126), one or more external resources that store usage information, and/or other sources. An external resource may include a server and/or other computer system that stores usage information. By way of non-limiting illustration, a theme park that tracks users via RFID enabled physical objects may include a computer system that stores usage information. The usage component 110 may be configured to obtain one or more of first usage information conveying recent and/or anticipated use of the first physical object, second usage information conveying recent and/or anticipated use of the second physical object, third usage information conveying recent and/or anticipated combined use of the first physical object and second physical object, and/or other information.

The content component 112 may be configured to determine content that is specific to one or more of individual identities of individual ones of one or more physical objects 128 detected as being present near or within the interior of the vehicle, combined identities of physical objects of one or more physical objects 128, and/or usage information obtained by usage component 110. By way of non-limiting illustration, content component 112 may be configured determine first content to present. The first content may be is specific to the identity of the first physical object and/or the first usage information. In some implementations, content may be specific to combined identities of a combination of two or more physical objects. By way of non-limiting illustration, content component 112 may be configured determine second content. The second content may be specific to the combined identities of the first physical object and a second physical object and/or the third usage information conveying the recent and/or anticipated combined use of the first physical object and second physical object.

In some implementations, content may be specific to an identity of one or more physical objects by virtue of the content being representative of the one or more physical objects. In some implementations, the content may be representative of one or more physical objects based on the content including one or both of visual depictions of appearance(s) of one or more physical objects 128 and/or audio characteristics of the one or more physical objects 128. By way of non-limiting illustration, a physical object may depict a fantastical character that has distinct voice. Content specific to the identity of the physical object may include a sound library that facilitates reproduction of the distinct voice, and/or other content.

In some implementations, content may be specific to usage information for a given physical object and/or combination of physical objects by virtue of the content being specific to the recent and/or anticipated use of the physical object and/or combination of physical objects. In some implementations, the content may be specific to the recent and/or anticipated use of the physical object and/or combination of physical objects based on the content making reference to the recent and/or anticipated use of the physical object and/or the combined use of the combination of physical objects. By way of non-limiting illustration, a physical object may have been used in a theme park and usage information may indicate that the physical object was taken on a ride. Content specific to that usage information may be an animation of a character that asks about the user's experience on that ride. By way of non-limiting illustration, a combination of physical objects may have been used with a gaming console and usage information may indicate that combination of physical objects resulted in the two game entities associated with different users having played together in the game. Content specific to that usage information may be an animation of a character that asks about the combined gameplay.

It is noted that the examples of content and its specific relationship to the identity of individual physical objects, identifies of combinations of virtual objects, usage information of a physical object, and/or combined usage information are for illustrative purposes only and are not to be considered limiting. For example, those skilled in the art may appreciate other types of content that may representative of identities of one or more physical objects and/or specific to the recent and/or anticipated use of a physical object and/or a combination of physical objects.

In some implementations, content may include one or more of audio content, tactile content, visual content, and/or other content.

Audio content may include sound libraries that facilitate reproducing specific sounds. The sounds may include one or more of speech, sound effects, and/or other sounds. The speech may include audio characteristics that are the same as, or similar to, an entity depicted by a physical object.

Tactile content may include content and/or experiences that can be sensed physically. By way of non-limiting illustration, tactile content may include one or more of a perceivable change in temperature, a vibration, and/or other content. In some implementations, tactile content may be provided via a climate control system of a vehicle. In some implementations, if a physical object has an identity that may be specific to a cold temperature (or hot temperature), a climate control system may be controlled to reduce (or increase) the temperature of air supplied by the climate control system.

In some implementations, visual content may include one or more of an animation, a movie, an interactive space, and/or other visual content. Visual content may be accompanied by audio content. An amination may include characters that the physical objects depict, environments that entities depicted by the physical objects may be associated with, and/or other content. A movie may include characters that the physical objects depict, environments that entities depicted by the physical objects may be associated with, and/or other content. An interactive space may comprise a space that may be more robust and/or interactive than an animation and/or movie. For example, an interactive space may include one or more games, one or more user-controllable elements, and/or other content.

In some implementations, visual content may include narrative content. Narrative content may generally follow a structure of a storytelling experience. The narrative content may include a story related to an identify of one or more physical objects and/or usage information.

In some implementations, content component 112 may be configured to implement an instance of an interactive space (e.g., virtual space) executed by the computer components to determine state of the interactive space. The state may then be communicated (e.g., via streaming visual data, object/position data, and/or other state information) from one or more physical processors 104 to one or more displays 122 for presentation to users. The state determined and presented may correspond to a location in the interactive space. The view described by the state may correspond, for example, to the location from which the view is taken, the location the view depicts, and/or other locations, a zoom ratio, a dimensionality of objects, a point-of-view, and/or parameters of the view. One or more of the view parameters may be selectable by the users.

An instance of the interactive space may comprise a simulated space. The simulated space may have a topography, express ongoing real-time interaction by one or more users, and/or include one or more virtual objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

In some implementations, the simulated space may be specific to one or more of a physical object, a combination of physical objects, an entity of which the physical object depicts, and/or other considerations. Accordingly, the simulated space may be fantastical space, a realistic space, and/or other types of content. By way of non-limiting illustration, the physical object may depict a movie character, and the simulated space may depict the environment that the character is depicted within that movie.

The above description of the manner in which the state of the interactive space is determined by content component 112 is not intended to be limiting. The content component 112 may be configured to express the interactive space in a more limited, or richer, manner. For example, views determined for the interactive space representing the state of the instance of the interactive space may be selected from a limited set of graphics depicting an event in a given place within the interactive space. The views may include additional content (e.g., text, audio, pre-stored video content, and/or other content) that describes particulars of the current state of the place, beyond the relatively generic graphics. Other expressions of individual places within the interactive space are contemplated.

Within the instance(s) of the interactive space executed by content component 112, users may control entities (e.g., game entities for gameplay), simulated physical phenomena (e.g., wind, rain, earthquakes, and/or other phenomena), and/or other elements within the interactive space to interact with the interactive space, other virtual objects, and/or other users. The game entities may include virtual characters such as avatars. The game entities may include virtual representations of the physical objects. As used herein, the term game entity may refer to a virtual object present in the interactive space that represents an individual user. A game entity may be controlled by the user with which it is associated. The user-controlled element(s) may move through and interact with the interactive space (e.g., non-user characters in the interactive space and/or other objects in the interactive space). The user-controlled elements controlled by and/or associated with a given user may be created and/or customized by the given user. The user may have an "inventory" of virtual items and/or currency that the user can use (e.g., by manipulation of a game entity or other user-controlled element, and/or other items) within the interactive space.

Control by users may be exercised through control inputs and/or commands input by the users through one or more input techniques, such as a controller (not shown in FIG. 1), voice-based inputs, gesture-based inputs, and/or other inputs. The users may interact with each other through communications exchanged within the interactive space. Such communications may include one or more of textual chat, instant messages, private messages, voice communications, and/or other communications. Communications may be received and entered by the users. Communications may be routed to and from the appropriate users through one or more physical processors 104 and/or through communications which are external to the system 100 (e.g., text messaging services).

The instance of the interactive space may be persistent. That is, the interactive space may continue on whether or not individual user are currently logged in and/or participating in the interactive space. A user who logs out of the interactive space and then logs back in some time later may find the interactive space has been changed through the interactions of other users with the interactive space during the time the user was logged out. These changes may include changes to the simulated physical space, changes in the user's inventory, changes in other users' inventories, changes experienced by non-player characters, changes to the virtual items available for use in the interactive space, changes based on ongoing changes to usage information, and/or other changes.

Games within the interactive space may be configured to elicit certain behaviors and/or actions from a user. For example, games may include objectives and/or goals which a user may attempt to complete through interaction with the game.

The control component 114 may be configured to control individual vehicle components of the one or more vehicle components of vehicle 102 to provide in-vehicle content that may be specific to one or both of the identity of one or more physical objects 128 and/or usage information for one or more physical objects 128. By way of non-limiting illustration, control component 114 may be configured to control a first vehicle component to provide the first content and/or other content.

In some implementations, controlling the one or more vehicle components may further include one or more of changing the presentation of content to reflect additional physical objects being detected (e.g., contemporaneously and/or sequentially), ceasing the presentation of content in response to one or more physical objects no longer being detect, and/or other control. In some implementations, changing the presentation of content to reflect additional physical objects being detected may include one or more of adding content, switching to new content, removing content, and/or other changes. In some implementations, changing the presentation of content to reflect additional physical objects being detected may include providing content that acknowledges the addition of one or more physical objects. By way of non-limiting illustration, an animation may be prompted to introduce and/or "say hello" to additional detected physical object(s).

In some implementations, control component 114 may be configured to, responsive to determining in-vehicle content to provide, determine which vehicle components of the one or more vehicle components are available to provide the content. For example, some content may be presentable via one or more specific vehicle components. Some vehicles may not include one or more of the vehicle components needed to present content. Accordingly, the control component 114 may be configured to determine which vehicle components are available, and then control the available vehicle components to provide content suitable for those type of available vehicle components. By way of non-limiting illustration, an animation may include visual content and audio content. The visual content may be presented via a display and the audio content may be presented via an audio output device. If a vehicle does not have a display but does have an audio output device, control component 114 may be configured to determine that the audio output device is available and the display is unavailable. The control component 114 may be configured to control the audio output device to provide the audio content of the animation, without presentation of visual content via a (nonexistent) display.

In some implementations, responsive to determining (e.g., via detection component 108) that one or more physical objects detected as being present near and/or within the interior of the vehicle are no longer near and/or within the interior of the vehicle, the control component 114 may be configured control the one or more vehicle components coupled to the vehicle to cease provision of content. By way of non-limiting illustration, responsive to determining that the first physical object is no longer present near and/or within the interior of the vehicle, control component 114 may be configured to cease provision of the first content by the first vehicle component.

In some implementations, responsive to detecting (e.g., via detection component 108) a combination of two or more physical objects as being concurrently present near and/or within the interior of the vehicle, detection component 108 may be configured to identify the combination of two or more physical objects, content component 112 may be configured to determine content that is specific to the identities of the combination of two or more physical objects, and/or control component 114 may be configured to control one or more vehicle components coupled to vehicle 102 to provide the content that is specific to the identity of the combination of two or more physical objects.

In some implementations, responsive to detecting (e.g., via detection component 108) a combination of two or more physical objects as being concurrently present near or within the interior of the vehicle, detection component 108 may be configured to identify the combination of two or more physical objects, usage component 110 may be configured to obtain usage information for the combination of two or more physical object, content component 112 may be configured determine content that is specific to the usage information for the combination of two or more physical object, and/or control component 114 may be configured to control one or more vehicle components coupled to the vehicle to provide the content that is specific to the usage information for the individual physical objects in the combination of two or more physical object.

Figure 4:
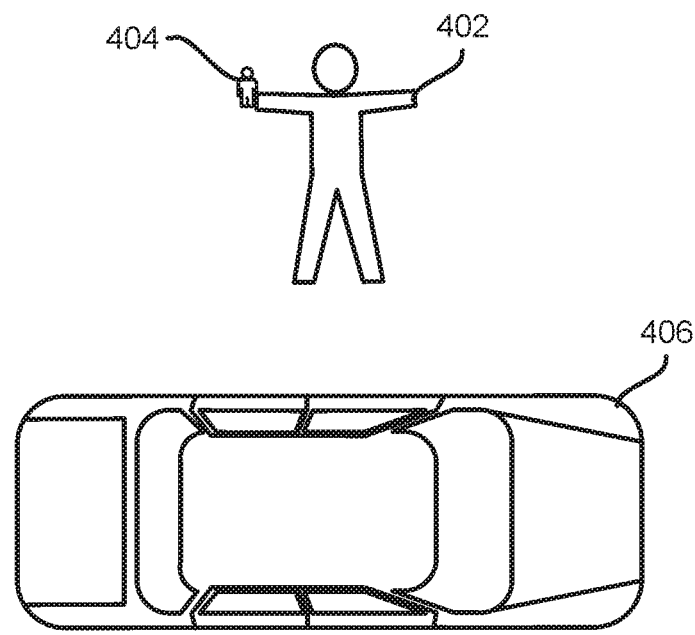
FIG. 4 shows a graphic of a user bringing a physical object near and/or within an interior of a vehicle.

FIG. 4 shows a graphic of a user 402 bringing a physical object 404 near an interior of a vehicle 406. The physical object 404 may physically embody an appearance of a virtual entity, such as a game entity, movie entity, and/or other entities. The user 402 may bring the physical object 404 within a threshold distance of vehicle 406 and/or may bring physical object 404 within an interior of vehicle 406 (FIG. 5).

Figure 5:
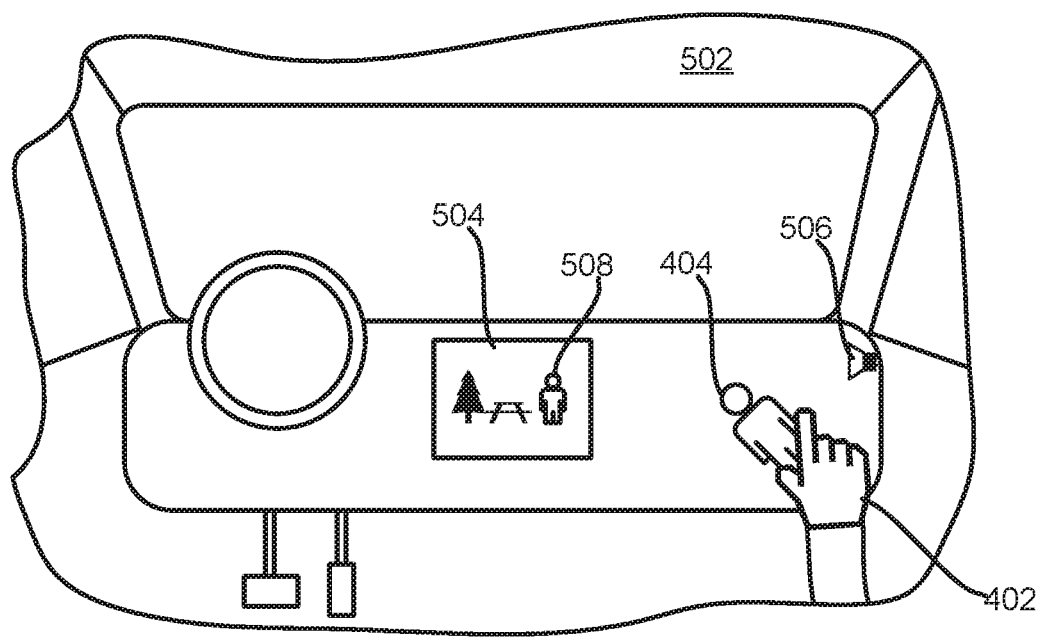
FIG. 5 shows a graphic illustrating presentation of in-vehicle content based on detection of a physical object near and/or within the interior of the vehicle.

FIG. 5 shows a graphic illustrating presentation of in-vehicle content based on detection of physical object 404 near (FIG. 4) and/or within (FIG. 6) an interior 502 of a vehicle (e.g., vehicle 406 in FIG. 4). The vehicle may include one or more vehicle components configured to present content. The one or more vehicle components may include one or more of a display 504, an audio output device 506, and/or other vehicle components. The display 504 may form part of one or both of an entertainment system and/or a navigation system. The audio output device 506 may form part of one or both of an entertainment system and/or a navigation system.

In some implementations, in-vehicle content may include visual content presented via display 504. The visual content may be specific to an identify of physical object 404 and/or usage information associated with physical object 404. By way of non-limiting illustration, in some implementations, the visual content may be specific to an identify of physical object 404 by virtue of the visual content including an animation including depictions of a virtual entity 508 of which physical object 404 physically resembles. The visual content may be accompanied by audio content (e.g., audio for the animation). In some implementations, the visual content may be specific to usage information for the physical object 404 by virtue of the visual content including an animation that prompts user 402 about the different recent and/or anticipated activities included in the usage information. By way of non-limiting illustration, virtual entity 508 may prompt user 402 with questions about their experience with the enumerated activities.

In some implementations, in-vehicle content may include audio content presented via audio output device 506. The audio content may be specific to an identify of physical object 404 and/or usage information associated with physical object 404. By way of non-limiting illustration, in some implementations, the audio content may be specific to an identify of physical object 404 by virtue of the audio content including an a voice that resembles the voice of a virtual entity of which physical object 404 physically resembles. By way of non-limiting illustration, the voice may be used to supplement the voice otherwise used for a navigation system of the vehicle. In some implementations, the audio content may be specific to usage information for the physical object 404 by virtue of the audio content including audio that prompts user 402 about the different recent and/or anticipated activities included in the usage information. By way of non-limiting illustration, the audio may simulate a conversation with the user to prompt the user 402 with questions about their experience with the enumerated activities.

Returning to FIG. 1, although one or more physical processors 104, one or more vehicle sensors 124, one or more dock 126, one or more physical objects 128, one or more displays 122, one or more audio output devices 120, and/or external resource(s) 130 are shown to be connected to network(s) 118 in FIG. 1, other communication medium may be used to facilitate interaction between any components of system 100. One or more components of system 100 may communicate through hard-wired communication, wireless communication, or both. For example, one or more physical processors 104 may wirelessly communicate with one or more vehicle sensors 124 and/or one or more docks 126. Wireless communication may include one or more of radio communication, Bluetooth communication, Wi-Fi communication, cellular communication, infrared communication, or other wireless communication.

Although one or more physical processors 104 is/are shown in FIG. 1 as a single entity, this is for illustrative purposes only. In some implementations, one or more physical processors 104 may comprise a plurality of processing units. These processing units may be physically located within the same device, or one or more physical processors 104 may represent processing functionality of a plurality of devices operating in coordination.

One or more physical processors 104 may be configured to execute one or more of components 108, 110, 112, 114, and/or other components by software; hardware; firmware; some combination of software, hardware, and/or firmware; and/or other mechanisms for configuring processing capabilities on one or more physical processors 104. Although components 108, 110, 112, and/or 114 are illustrated in FIG. 1 as being co-located within a single processing unit, in implementations in which one or more physical processors 104 comprises multiple processing units, one or more of 108, 110, 112, and/or 114 may be located remotely from the other computer program components. The description of the functionality provided by the different computer program components 108, 110, 112, and/or 114 is for illustrative purposes, and is not intended to be limiting, as any of computer program components 108, 110, 112, and/or 114 may provide more or less functionality than is described. For example, one or more of computer program components 108, 110, 112, and/or 114 may be eliminated, and some or all of its functionality may be provided by other computer program components 108, 110, 112, and/or 114. As another example, one or more physical processors 104 may be configured to execute one or more additional computer program components that may perform some or all of the functionality attributed to one or more of computer program components 108, 110, 112, and/or 114.

The electronic storage 117 of one or more physical processors 104 may include electronic storage media that electronically stores information. The electronic storage 117 may store software algorithms, information determined by one or more physical processors 104, information received from other components of system 100, and/or other information that enables system 100 to function properly.

The electronic storage media of electronic storage 117 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 117 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 117 may be a separate component within system 100, or electronic storage 117 may be provided integrally with one or more other components of system 100 (e.g., one or more physical processors 104). Although electronic storage 117 is shown in FIG. 1 as a single entity, this is for illustrative purposes only. In some implementations, electronic storage 117 may comprise a plurality of storage units. These storage units may be physically located within the same device, or electronic storage 117 may represent storage functionality of a plurality of devices operating in coordination.

The external resource(s) 130 may include sources of information, hosts (e.g., a host server that serves content), external entities participating with system 100, providers of content, and/or other resources. In some implementations, some or all of the functionality attributed herein to external resource(s) 130 may be provided by resources included in system 100.

Figure 2:
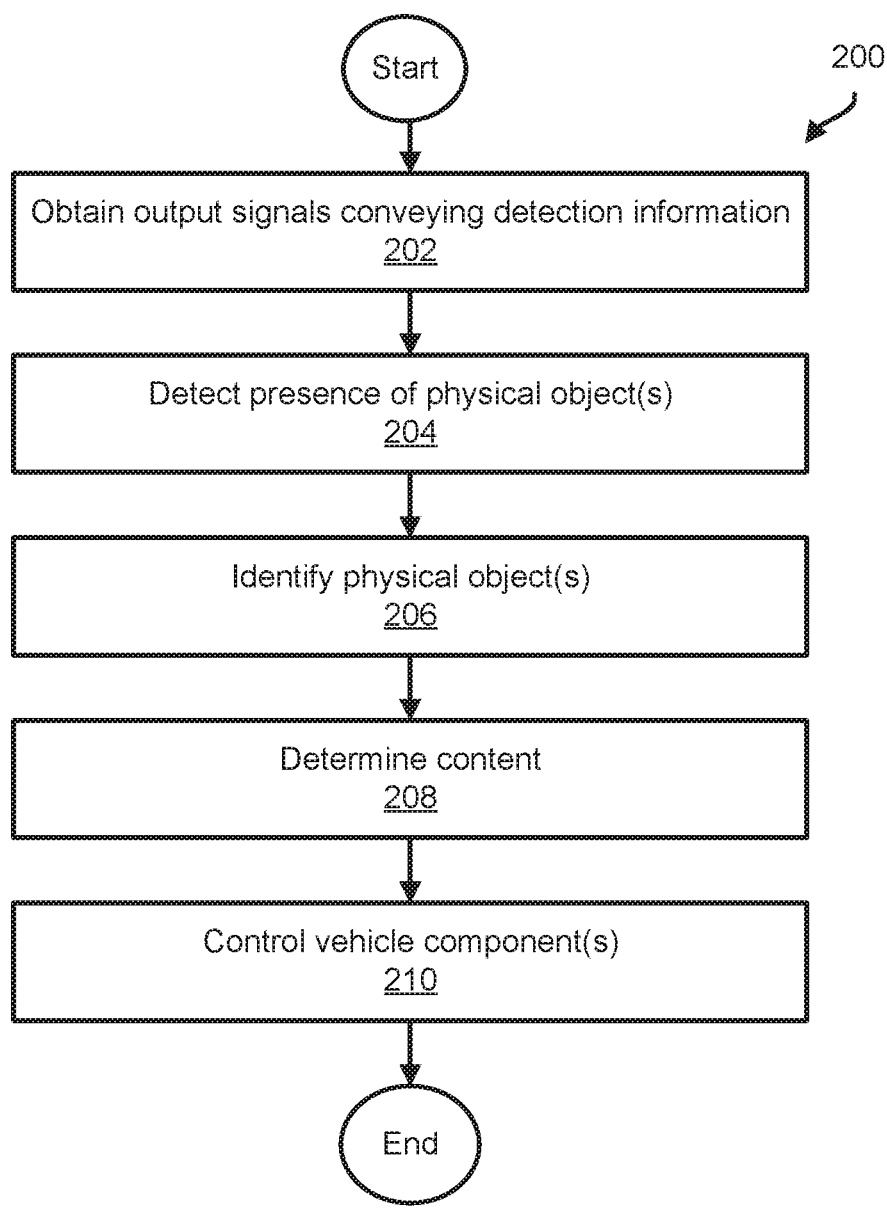
FIG. 2 illustrates a method to trigger presentation of in-vehicle content, in accordance with one or more implementations.

FIG. 2 illustrates method 200 to trigger presentation of in-vehicle content based on detected physical objects, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a computer system comprising one or more processing devices (e.g., a hardware processor, a digital processor, an analog processor, a digital circuit designed to process information, a central processing unit, a graphics processing unit, a microcontroller, an analog circuit designed to process information, a state machine, and/or other mechanisms for electronically processing information) and/or other devices. The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200. The one or more processing devices may be the same as or similar to one or more physical processors 104 in FIG. 1.

Referring to FIG. 2 and method 200, at operation 202, output signals conveying detection information and/or other information may be obtained. The detection information may facilitate detection and/or identification of physical objects near and/or within an interior of a vehicle. In some implementations, operation 202 may be performed by one or more physical processors executing a processor component the same as or similar to detection component 108 (shown in FIG. 1 and described herein).

At operation 204, presence of one or more physical objects near and/or within the interior of the vehicle may be detected. By way of non-limiting illustration, presence of a first physical object may be detected near and/or within the interior of the vehicle. In some implementations, operation 204 may be performed by one or more physical processors executing a processor component the same as or similar to detection component 108 (shown in FIG. 1 and described herein).

At operation 206, the one or more physical objects detected as being present near or within the interior of the vehicle may be identified. By way of non-limiting illustration, operation 206 may include identifying the first physical object. In some implementations, operation 206 may be performed by one or more physical processors executing a processor component the same as or similar to detection component 108 (shown in FIG. 1 and described herein).

At operation 208, content that may be specific to the identity of the one or more physical objects detected as being present near or within the interior of the vehicle may be determined. By way of non-limiting illustration, first content specific to the identification of the first physical object may be determined. In some implementations, operation 208 may be performed by one or more physical processors executing a processor component the same as or similar to content component 112 (shown in FIG. 1 and described herein).

At operation 210, one or more vehicle components coupled to the vehicle may be controlled to provide the content that may be specific to the identity of the one or more physical objects. By way of non-limiting illustration, a first vehicle component may be controlled to provide the first content. In some implementations, operation 210 may be performed by one or more physical processors executing a processor component the same as or similar to control component 114 (shown in FIG. 1 and described herein).

Figure 3:
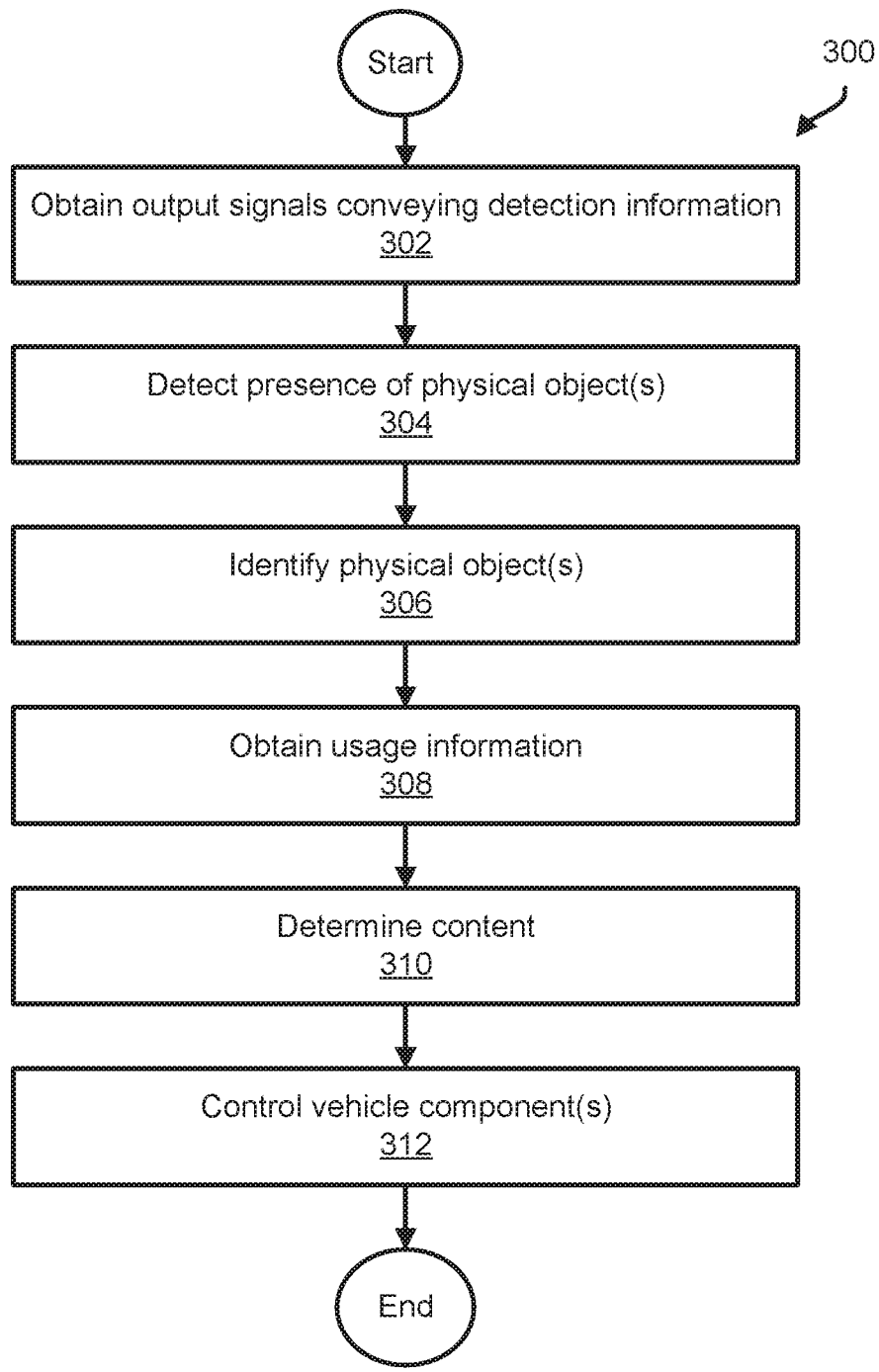
FIG. 3 illustrates a method to trigger presentation of in-vehicle content, in accordance with one or more implementations.

FIG. 3 illustrates method 300 to trigger presentation of in-vehicle content based on detected physical objects, in accordance with one or more implementations. The operations of method 300 presented below are intended to be illustrative. In some implementations, method 300 may be accomplished with one or more additional operations not described, and/or without one or more of the operations discussed. In some implementations, two or more of the operations may occur substantially simultaneously.

In some implementations, method 300 may be implemented in a computer system including one or more processing devices (e.g., a hardware processor, a digital processor, an analog processor, a digital circuit designed to process information, a central processing unit, a graphics processing unit, a microcontroller, an analog circuit designed to process information, a state machine, and/or other mechanisms for electronically processing information) and/or other components. The one or more processing devices may include one or more devices executing some or all of the operations of method 300 in response to instructions stored electronically on one or more electronic storage mediums. The one or more processing devices may include one or more devices configured through hardware, firmware, and/or software to be specifically designed for execution of one or more of the operations of method 300. The one or more processing devices may be the same as or similar to one or more physical processors 104 in FIG. 1.

Referring to FIG. 3 and method 300, at operation 302, output signals conveying detection information and/or other information may be obtained. The detection information may facilitate detection and/or identification of physical objects near and/or within an interior of a vehicle. In some implementations, operation 302 may be performed by one or more physical processors executing a processor component the same as or similar to detection component 108 (shown in FIG. 1 and described herein).

At operation 304, presence of one or more physical objects near and/or within the interior of the vehicle may be detected. By way of non-limiting illustration, presence of a first physical object may be detected near and/or within the interior of the vehicle. In some implementations, operation 304 may be performed by one or more physical processors executing a processor component the same as or similar to detection component 108 (shown in FIG. 1 and described herein).

At operation 306, the one or more physical objects detected as being present near or within the interior of the vehicle may be identified. By way of non-limiting illustration, operation 306 may include identifying the first physical object. In some implementations, operation 306 may be performed by one or more physical processors executing a processor component the same as or similar to detection component 108 (shown in FIG. 1 and described herein).

At operation 308, usage information may be obtained. The usage information may convey recent and/or anticipated use of the one or more physical objects detected as being present near and/or within the interior of the vehicle. By way of non-limiting illustration, first usage information conveying recent and/or anticipated use of the first physical object may be obtained. In some implementations, operation 308 may be performed by one or more physical processors executing a processor component the same as or similar to usage component 110 (shown in FIG. 1 and described herein).

At operation 310, content that may be specific to the usage information may be determined. By way of non-limiting illustration, first content specific to the first usage information may be determined. In some implementations, operation 310 may be performed by one or more physical processors executing a processor component the same as or similar to content component 112 (shown in FIG. 1 and described herein).

At operation 312, one or more vehicle components coupled to the vehicle may be controlled to provide the content that may be specific to the usage information. By way of non-limiting illustration, a first vehicle component may be controlled to provide the first content. In some implementations, operation 312 may be performed by one or more physical processors executing a processor component the same as or similar to control component 114 (shown in FIG. 1 and described herein).

Although the system(s) and/or method(s) of this disclosure have been described in detail for the purpose of illustration based on what is currently considered to be the most practical and preferred implementations, such detail is solely for that purpose and that the disclosure is not limited to the disclosed implementations, but, on the contrary, is intended to cover modifications and equivalent arrangements that are within the spirit and scope of the appended claims. The present disclosure contemplates that, to the extent possible, one or more features of any implementation can be combined with one or more features of any other implementation.

What is claimed is:

1. A system configured to trigger presentation of in-vehicle content based on detected physical objects, the system being coupled to a vehicle, the system comprising:
   one or more physical processors configured by machine readable instructions to:
   obtain output signals conveying detection information, the detection information facilitating detection and identification of physical objects near and/or within an interior of the vehicle;
   detect, based on the output signals, presence of one or more physical objects near and/or within the interior of the vehicle, including detecting presence of a first physical object near and/or within the interior of the vehicle;
   identify, based on the output signals, the one or more physical objects detected as being present near and/or within the interior of the vehicle, including identifying the first physical object;
   determine content that is specific to the identity of the one or more physical objects detected as being present near and/or within the interior of the vehicle, including determining first content that is specific to the identity of the first physical object;
   control one or more vehicle components coupled to the vehicle to provide the content that is specific to the identity of the one or more physical objects, including controlling a first vehicle component to provide the first content; and
   responsive to detecting a combination of two or more physical objects as being concurrently present near and/or within the interior of the vehicle, identify the combination of two or more physical objects, determine content that is specific to the combination of the identities of two or more physical objects, and control one or more vehicle components coupled to the vehicle to provide the content that is specific to the identity of the combination of two or more physical objects, such that:
   responsive to detecting presence of a second physical object near and/or within the interior of the vehicle concurrently with the first physical object:
   identify the second physical object;
   determine second content that is specific to the combination of the identities of the first physical object and the second physical object, the second content including a combination of content specific to the identities of both the first physical object and the second physical object; and
   control a first vehicle component to provide the second content.

2. The system of claim 1, wherein the one or more physical processors are further configured by the machine-readable instructions to:
   responsive to determining that the one or more physical objects detected as being present near and/or within the interior of the vehicle are no longer near and/or within the interior of the vehicle, control the one or more vehicle components coupled to the vehicle to cease provision of the content, such that:
   responsive to determining that the first physical object is no longer present near and/or within the interior of the vehicle, cease provision of the first content by the first vehicle component.

3. The system of claim 1, wherein the first physical object is associated with a first user and the second physical object is associated with a second user.

4. The system of claim 1, wherein the first content is specific to the identity of the first physical object by virtue of the first content being representative of the first physical object.

5. The system of claim 4, wherein the first content is representative of the first physical object based on the first content including one or both of visual depictions of an appearance of the first physical object and/or audio characteristics of the first physical object.

6. The system of claim 1, wherein the one or more physical objects include a toy figurine and/or an article of clothing.

7. The system of claim 1, wherein the one or more physical processors are further configured by the machine-readable instructions to:
   determine which vehicle components of the one or more vehicle components are available to provide the content.

8. A method to trigger presentation of in-vehicle content based on detected physical objects, the method comprising:
   obtaining output signals conveying detection information, the detection information facilitating detection and identification of physical objects near and/or within an interior of a vehicle;
   detecting, based on the output signals, presence of one or more physical objects near and/or within the interior of the vehicle, including detecting presence of a first physical object near and/or within the interior of the vehicle;

identifying, based on the output signals, the one or more physical objects detected as being present near and/or within the interior of the vehicle, including identifying the first physical object;

determining content that is specific to the identity of the one or more physical objects detected as being present near and/or within the interior of the vehicle, including determining first content that is specific to the identity of the first physical object; and controlling one or more vehicle components coupled to the vehicle to provide the content that is specific to the identity of the one or more physical objects, including controlling a first vehicle component to provide the first content; and responsive to detecting a combination of two or more physical objects as being concurrently present near and/or within the interior of the vehicle, identifying the combination of two or more physical objects, determining content that is specific to the combination of the identifies of two or more physical objects, and controlling one or more vehicle components coupled to the vehicle to provide the content that is specific to the identity of the combination of two or more physical objects, such that:

responsive to detecting presence of a second physical object near and/or within the interior of the vehicle concurrently with the first physical object:

identifying the second physical object;

determining second content that is specific to the combination of the identities of the first physical object and the second physical object, the second content including a combination of content specific to the identities of both the first physical object and the second physical object; and controlling a first vehicle component to provide the second content.

9. The method of claim 8, further comprising:

responsive to determining that the one or more physical objects detected as being present near and/or within the interior of the vehicle are no longer near and/or within the interior of the vehicle, controlling the one or more vehicle components coupled to the vehicle to cease provision of the content, such that:

responsive to determining that the first physical object is no longer present near and/or within the interior of the vehicle, ceasing provision of the first content by the first vehicle component.

10. The method of claim 8, wherein the first physical object is associated with a first user and the second physical object is associated with a second user.

11. The method of claim 8, wherein the first content is specific to the identity of the first physical object by virtue of the first content being representative of the first physical object.

12. The method of claim 11, wherein the first content is representative of the first physical object based on the first content including one or both of visual depictions of an appearance of the first physical object and/or audio characteristics of the first physical object.

13. The method of claim 8, wherein the one or more physical objects include a toy figurine and/or an article of clothing.

14. The method of claim 8, further comprising:

determining which vehicle components of the one or more vehicle components are available to provide the content.

* * * * *